July 28, 1931. J. FISCHER-HINNEN Re. 18,136
ELECTRICAL IGNITION DEVICE
Original Filed March 25, 1920
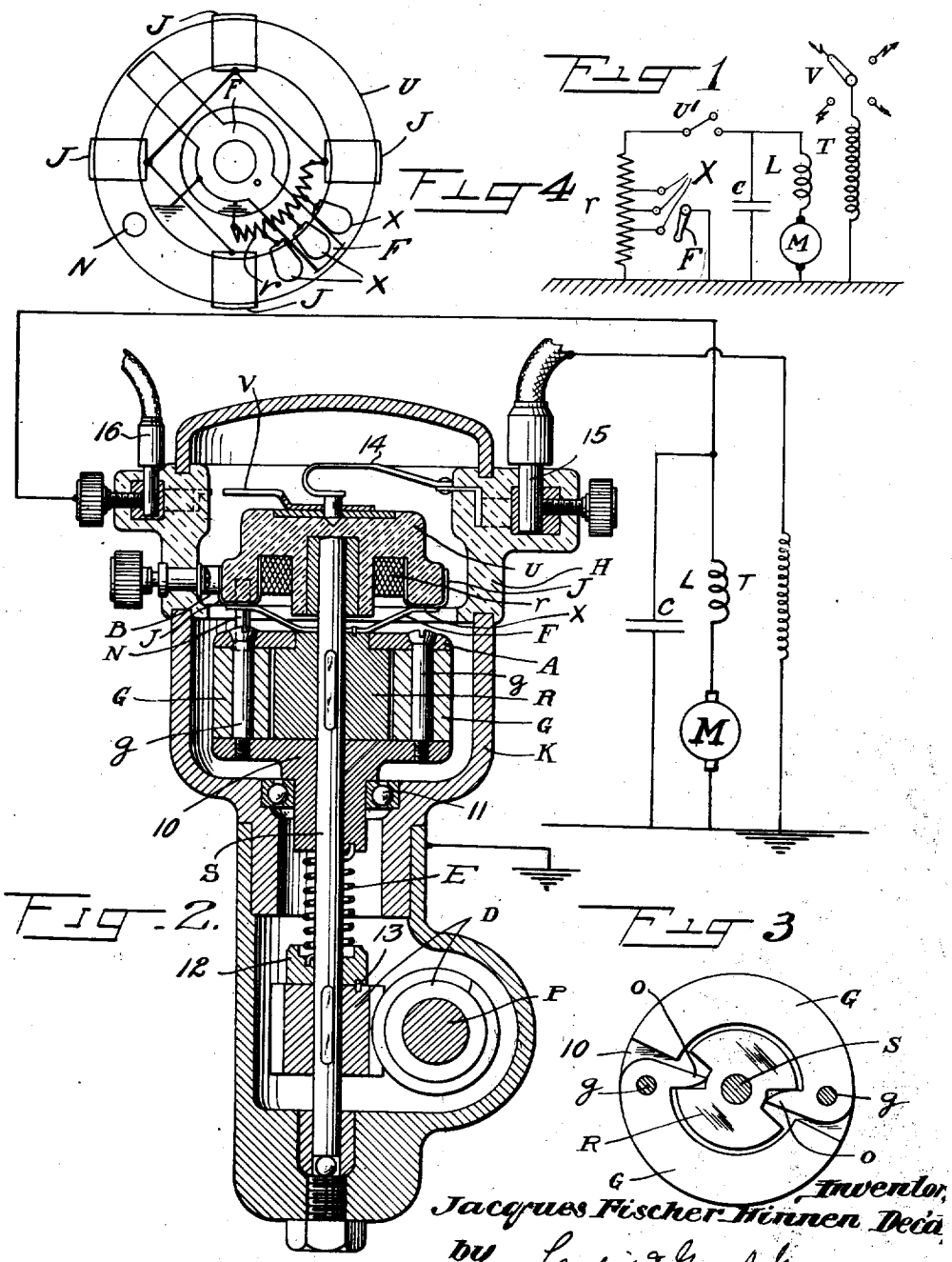
Inventor,
Jacques Fischer-Hinnen Deceased
by Landis & Gyr A.G.
Assignee
BY John D. Morgan
ATTORNEY.

Reissued July 28, 1931

Re. 18,136

UNITED STATES PATENT OFFICE

JACQUES FISCHER-HINNEN, DECEASED, LATE OF OERLIKON, SWITZERLAND, BY LANDIS & GYR, A.-G., OF ZUG, SWITZERLAND, ASSIGNEE

ELECTRICAL IGNITION DEVICE

Original No. 1,611,826, dated December 21, 1926. Serial No. 368,734, filed March 25,1920, and in Switzerland March 25, 1919. Application for reissue filed May 3, 1928. Serial No. 274,944.

My invention consists in an igniting apparatus which can be directly driven by the motor and is provided with means to vary the resistance and vary the relative displacement of the primary interruption with respect to the position of the driving shafts.

In the accompanying drawings.

Fig. 1 is a diagram of an ignition system according to my invention;

Fig. 2 is a sectional view of my improved ignition device; with a diagrammatic showing of the wiring connections of the ignition system with which the device is connected.

Fig. 3 is a detail transverse sectional view of the same.

Fig. 4 is a diagrammatic plan of the under side of the rotor member of the ignition device showing a portion of the variable resistance short-circuited.

In the diagrammatic Figure 1, showing an ignition system in which my apparatus can be employed, M is a generator, T a transformer to produce the necessary high potential, C a condenser, U′ a breaker for interrupting the primary circuit, V a high tension distributor, $r$ a series resistance, a portion of which can be short-circuited to increase the intensity of the current in the circuits, and L the primary coil of the transformer. When starting, the greatest portion of resistance $r$ is short circuited to give a more intense spark and more of the resistance is placed in series only with an increase in the speed of the engine with which the ignition system is employed. In this diagrammatic showing a distributor for a four cylinder engine is indicated, however, the distributor may be provided with more or less contacts for engines having more or less cylinders.

In the present preferred embodiment of the invention there is provided means for periodically interrupting the primary circuit and therby creating the necessary secondary potential to cause the spark necessary for ignition, comprising as shown in Figure 2, a rotor U loosely mounted on a vertical spindle S and rotatable therewith. Spindle S is supported in suitable bearings formed in the casing K and is driven by worm and worm gear D from a suitable drive shaft P rotating at a speed definitely related to the speed of the engine with which the ignition device is used.

Around the periphery of rotor U are contact members J, equal in number to the number of cylinders in the engine with which the ignition device is employed, and these contact members J are connected with series resistances, mounted in a recess in the rotor, and which in turn are connected with a plurality of taps X, contacting with brushes F which are connected with the ground through spindle S as diagrammatically shown in Figure 4. Surrounding the rotor U is a casing H formed of suitable insulating material and supporting a brush B which contacts with the contacts J on the periphery of the rotor. Brush B is provided with a suitable binding post so that it can be connected with the primary coil L of transformer T and a suitable source of power such as a generator M as diagrammatically indicated. As rotor U is turned the circuit is made and broken each time a contact J moves across brush B.

Means are also provided for varying the angular relation of the rotor to the spindle S and thereby advancing and retarding the spark, and these means are preferably controlled in accordance with the speed of the engine as imparted to the ignition device through shaft P. As embodied, spindle S carries a loosely journalled collar 10 which provides an additional support for spindle S by means of ball bearing 11, this collar being driven from the gear D by means of spring E coiled around spindle S and connected to a collar 12 by pin 13. Collar 10 is mounted on spindle S just below carrier disc R which is securely and rigidly mounted on spindle S. Centrifugally actuated weights G of curved form and having noses O, engaging in slots cut in carrier disc R, are pivotally mounted on collar 10 by pins $g$, the pins also passing through a disc A freely movable on carrier disc R. These weights G are normally held in by action of spring E, and on rotation, are moved outwardly by centrifugal force causing disc A to be moved relative to carrier R. A pin N secured to disc A is received in a recess in the rotor U and thereby drives the rotor. As the disc A is moved relative to spindle R, rotor U is similarly moved and causes the time of breaking the circuit to be correspondingly changed.

For changing the resistance in accordance with the speed to give a more intense spark at low speeds, brushes F are mounted on carrier R to contact with resistance leads or taps X, as indicated in Figure 4, so that the current will pass through only a portion of resistance as shown, at low speeds, the amount of series resistance being increased as the speed increases. Figure 4 shows a bottom end view of the rotor member U with a diagrammatic representation of the resistance, *r*, taps X, contacts J and the brush F in a midway position which it may assume when the engine is running at a moderate speed; when the engine is stopped, of course brush F short circuits more of resistance, *r*, and at a high speed resistance, *r*, is all in series with contacts J. The primary circuit thus includes the source of power M grounded on one side and on the other side primary coil L of transformer T which in turn is connected to brush B, a contact J, the series resistance *r*, a tap *x*, brush F and the spindle S which is connected with the ground.

The time of ignition can also be varied by manually moving casing H on casing K which causes a relative movement of brush B with respect to the contacts J.

For distributing the secondary current to the proper spark plugs, there is provided a distributor arm V, mounted on rotor U which is connected to the secondary winding of transformer T by spring 14, and cable 15. As this arm V rotates, it distributes the secondary current to the several cables 16, through contacts 17.

Having now described my invention what I claim as new, and desire to secure by Letters Patent, is:

1. An electric ignition device having primary and secondary windings comprising in combination means for automatically timing the ignition and means for attaining constant ignition voltage by varying the electrical resistance in the primary oscillatory circuit and comprising a spindle, a carrier fixed to said spindle, a centrifugally acting breaker, a distributor and a series resistance on said carrier and means to vary the position of said carrier on said spindle.

2. An electrical ignition system comprising in combination a rotary distributer, primary and secondary circuits associated therewith, means for driving the distributer, speed responsive means for advancing the spark, a resistance in said primary circuit and means operated by said speed responsive means for increasing the resistance as the speed increases.

3. In an ignition device for an ignition system including primary and secondary circuits, a rotor, a spindle on which the rotor is supported, a resistance on said rotor, a member on said spindle adapted to contact with and short-circuit a part of said resistance, speed-responsive means for varying the amount of resistance so short circuited, and means for periodically breaking the primary circuit.

4. In an ignition device for an ignition system including primary and secondary circuits, a rotor, a spindle on which the rotor is supported, a distributer arm on said rotor, means for making and breaking the primary circuit, speed-responsive means for advancing or retarding the making and breaking of the primary circuit, a resistance in the primary circuit and mounted on said rotor, a member carried on said spindle adapted to contact with and vary the resistance as the speed of rotation changes.

5. In an ignition device for internal combustion engine ignition systems including the usual primary and secondary transformer coils and source of power for intermittently energizing the primary coil of the transformer, a rotary driving shaft to be driven at a speed corresponding with engine speeds, a governor carried by said shaft, a distributor also carried by said shaft and adapted to be advanced or retarded by said governor in response to engine speeds, stationary contacts cooperating with the distributor, a resistance mounted on the distributor and connected in series with the primary circuit of the ignition system, and means operated by the governor for increasing or decreasing the effective amount of said resistance in the primary circuit of the ignition system.

6. In an ignition system for internal combustion engines including a transformer having primary and secondary coils and a source of electromotive force connected therewith, the combination with a rotary ignition timer also connected therewith and adapted to be driven by the engine, of a resistance adapted to be inserted in series with the primary of said transformer for varying the current therethrough, and means controlled by the speed of the engine for increasing or decreasing the amount of said resistance in the primary circuit of the transformer.

7. An electric ignition system including primary and secondary windings comprising in combination means for automatically timing the ignition and means for attaining substantially constant ignition voltage and including a spindle, a rotor, centrifugally controlled means for breaking the primary circuit, a resistance mounted on said rotor in series with the primary circuit, and means for varying the amount of said resistance in the primary oscillatory circuit.

8. An electric ignition device including a shaft, a carrier fixed thereto and bearing a contact spring, a distributer rotor mounted on said spindle and carrying a resistance a portion of which may be short-circuited by said spring, a distributer contact on said distributer rotor, a brush with which said contact intermittently engages, and centrifugal means mounted on said spindle to move the rotor relative to the spring for varying the timing and resistance.

Signed at Zurich, Switzerland, this 13th day of April, 1928.

LANDIS & GYR, A.-G.,
*Assignee of Jacques Fischer-Hinnen, Deceased.*

By WALTER THUET,
*Director.*